Figure 1:
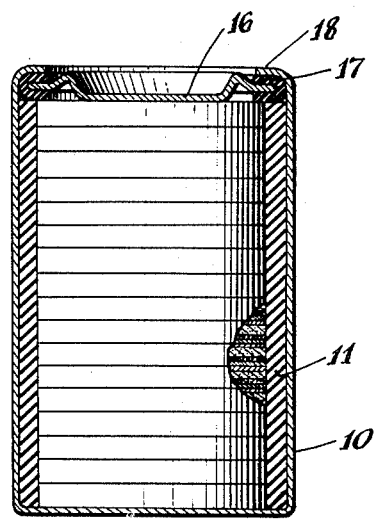

April 26, 1955 S. RUBEN 2,707,199
POTENTIAL PRODUCING CELL AND HIGH VOLTAGE PILE
Filed Jan. 4, 1954

INVENTOR
Samuel Ruben
BY
ATTORNEY

United States Patent Office 2,707,199
Patented Apr. 26, 1955

2,707,199

POTENTIAL PRODUCING CELL AND HIGH VOLTAGE PILE

Samuel Ruben, New Rochelle, N. Y.

Application January 4, 1954, Serial No. 402,013

8 Claims. (Cl. 136—83)

This invention relates to a potential producing cell and to high voltage dry batteries constructed with said cells.

An object of the invention is the provision of a potential producing dry cell capable of holding its potential over long periods of time.

A further object is the provision of a non-aqueous, high voltage dry battery.

Another object is the provision of a dry cell containing no aqueous electrolyte and which may be conveniently assembled into a sealed high voltage dry battery operable over wide temperature limits with minimum change in characteristics.

Further objects will be apparent from the disclosure and from the drawings which are views partly in section of a cell and a high voltage dry battery embodying the invention.

Broadly the invention comprises a non-aqueous dry cell employing a solid ionic conductor of tin sulfate.

I have found that discs compressed from tin sulfate are electrically conductive and when placed in contact with dissimilar materials they will generate a potential at these contacts depending on the electrochemical difference in the materials and will maintain their potential under various conditions of shelf life. Essentially the invention contemplates a cell capable of holding a constant potential at open circuit condition and one where only extremely low currents are required.

Tin sulfate, being solid and ionically conductive, does not depend upon nor does it require the addition of any moisture, humectants or other agents.

Typical cell components are nickel or nickel-plated steel as the negative electrode, tin sulfate as the dry solid ionic conductor and lead peroxide as the positive terminal, the tin sulfate being the middle member. This combination provides a potential of 1.65 volts most of which is generated at the interface between the tin sulfate and the lead peroxide. Nickel and nickel alloys such as stainless steels or Monel may be employed as the negative electrode.

Other dissimilar negative and positive electrode materials will provide a potential, for example, negative terminals of lead or tin, and positive terminals of other electronegative depolarizer compounds such as the oxides of manganese, mercury, silver, copper or graphite mixtures with these oxides or permanganates. The nickel-tin sulfate-lead peroxide cell is capable of supplying several microamperes for short periods and thereafter recovering to its 1.65 volts. Essentially, however, the couple is useful where potentials are required rather than current or when the current flow is of an instantaneous character.

In the manufacture of cell components for a typical high voltage battery assembly the tin sulfate, preferably Fisher Scientific Company grade labeled "Pure" or City Chemical Corporation grade labeled "C. P.," is compressed at 10 tons per square inch into 1 inch discs about ⅛ inch thick, then crushed, granulated and pressed at a pressure of 6 tons per square inch into ½ inch diameter pellets. A weight of 400 milligrams provides a pellet about 30 mils thick. The positive terminal may be made by electrodepositing lead peroxide from a lead nitrate solution onto a 5 mil thick carbonized iron strip, the lead peroxide being deposited on the strip as a solid, integral layer. Discs can be readily punched from this strip of the same diameter as the tin sulfate pellet. One side of the carbonized iron is masked so that the deposition occurs only on one side. Alternatively, the positive electrode may be made by granulating to 40-mesh size a precompressed mixture of electrolytically produced lead peroxide and 0.5% of gum arabic. The gum assists in binding the lead peroxide particles, the mixture being compressed at 6 tons pressure to produce discs of ½ inch diameter. 500 milligrams of the lead peroxide mixture produce a ½ inch disc of about 30 mils thickness. The discs are baked at 100° C. before use to eliminate any moisture. Other binding agents, such as paraffin, styrene, polyvinyl, etc., may be used in place of the gum arabic and in the same proportion.

The discs may be stacked up in series and due to the freedom from free moisture effects, when sealed as shown in the accompanying drawing, there is negligible edge leakage to bring about discharge of the cells.

Figure 2:
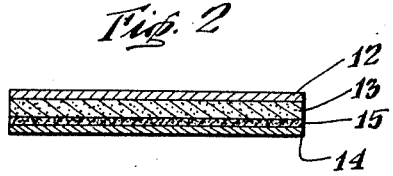

Figure 2 of the drawing illustrates a single cell assembly in which one side of the tin sulfate electrode 13 is in contact with the nickel negative electrode 12. The positive electrode comprises carbonized iron base 14, having a coating of lead peroxide 15, the coating contacting the tin sulfate conductor.

Figure 1 illustrates an assembly of the cells described in Figure 2 into a sealed high voltage pile or battery in which the outer casing 10, comprising nickel-plated steel has a styrene tube 11 lining the inside wall. The cells are stacked in the tube in the order of nickel, tin sulfate and lead peroxide, a sufficient number of cells being employed to provide the desired voltage. Using a 20 mil thick pellet of tin sulfate, a 5 mil thick nickel-plated steel electrode and electro-plated lead peroxide carbonized iron discs, the total thickness per couple or cell is approximately 31 mils, thus allowing the provision of about 40 volts per inch length. The top terminal 16 of the battery is insulated from the container 10 by a polyethylene grommet 17. The battery is sealed from atmospheric effects and pressure applied to the cells by crimping the steel container at 18 against the polyethylene grommet. It will be observed that the nickel plated steel serves as one terminal and that the top closure of the battery serves as the other terminal. For some structures, a compression element, such as a spring, may be added to insure continuous pressure on the stack under all conditions.

Where higher discharge currents are desirable, which would necessarily require large areas, roll type structures may be employed, utilizing lead peroxide coated carbonized iron and nickel foils, separated by paper impregnated with tin sulfate.

I claim:

1. A potential producing dry cell having a solid electrolyte comprising tin sulfate and cooperating electrodes in contact therewith.

2. A potential producing dry cell having a solid ionic conductor comprising tin sulfate, and cooperating electrodes in contact therewith, the positive electrode containing a relatively small amount of binder admixed therein.

3. A potential producing cell comprising a solid ionic conductor of tin sulfate, a cooperating electrode in contact therewith having a nickel surface.

4. A potential producing cell having a solid ionic conductor comprising tin sulfate and a cooperating electrode in contact therewith having a surface of lead peroxide.

5. A potential producing cell comprising a solid ionic conductor and two electrodes in juxtaposition, the middle element comprising tin sulfate as the solid ionic conductor, the surfaces of the two electrodes in contact with the tin sulfate comprising nickel and lead peroxide respectively.

6. A potential producing cell having a solid ionic conductor comprising tin sulfate, a contacting metal electrode on one side thereof and a contacting conductive depolarizer on the other side thereof.

7. A dry battery comprising a series of stacked cells under pressure, said cells comprising negative electrodes of nickel, positive electrodes of lead peroxide and solid non-aqueous electrolytes of tin sulfate.

8. A voltage pile comprising a series of stacked cells, said cells comprising positive and negative electrodes in contact with solid electrolytes of tin sulfate, said pile being housed in a sealed casing.

References Cited in the file of this patent

UNITED STATES PATENTS 2,631,180    Robinson _____ Mar. 10, 1953